US012607706B2

(12) United States Patent
Mizugaki et al.

(10) Patent No.: US 12,607,706 B2
(45) Date of Patent: Apr. 21, 2026

(54) ALTITUDE CALCULATION METHOD AND ALTITUDE CALCULATION PROGRAM FOR FLYING BODY, AND FLYING BODY INCLUDING THE SAME

(71) Applicant: Hitachi, Ltd., Tokyo (JP)

(72) Inventors: Kenichi Mizugaki, Tokyo (JP); Yuichi Igarashi, Tokyo (JP); Masanori Ishino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 139 days.

(21) Appl. No.: 18/377,641

(22) Filed: Oct. 6, 2023

(65) Prior Publication Data

US 2024/0125886 A1     Apr. 18, 2024

(30) Foreign Application Priority Data

Oct. 13, 2022     (JP) ................................. 2022-164927

(51) Int. Cl.
| | |
|---|---|
| *G01S 5/02* | (2010.01) |
| *G01C 5/00* | (2006.01) |
| *G01S 13/42* | (2006.01) |
| *G05D 1/00* | (2024.01) |
| *H04B 17/318* | (2015.01) |

(52) U.S. Cl.
CPC .......... *G01S 5/02585* (2020.05); *G01C 5/005* (2013.01); *G01S 13/42* (2013.01); *G05D 1/0202* (2013.01); *H04B 17/318* (2015.01)

(58) Field of Classification Search
CPC ..... G01S 5/02585; G01S 13/42; G01C 5/005; G05D 1/0202; H04B 17/318
See application file for complete search history.

(56) References Cited

U.S. PATENT DOCUMENTS

| | | | | |
|---|---|---|---|---|
| 12,333,756 | B2 * | 6/2025 | Arksey | ................... G08G 5/57 |
| 2013/0002855 | A1 * | 1/2013 | Ratti | ................... H04N 13/388 |
| | | | | 348/E7.085 |
| 2016/0371985 | A1 * | 12/2016 | Kotecha | ............. H04B 7/18506 |
| 2017/0311127 | A1 * | 10/2017 | Murphy | ............. G01S 5/02521 |
| 2018/0233055 | A1 * | 8/2018 | Damnjanovic | .......... G08G 5/57 |
| 2019/0164442 | A1 * | 5/2019 | Just | ......................... G08G 5/55 |
| 2019/0278302 | A1 * | 9/2019 | Sundaresan | ............. G01S 19/46 |
| 2020/0264629 | A1 * | 8/2020 | Maveddat | ............ G05D 1/0276 |
| 2021/0349456 | A1 * | 11/2021 | Pham | ................... G05D 1/0676 |
| 2023/0315120 | A1 * | 10/2023 | Linkowski | ........... G05D 1/0274 |
| | | | | 701/26 |
| 2023/0362694 | A1 * | 11/2023 | Swar | ..................... H04W 24/08 |

FOREIGN PATENT DOCUMENTS

| | | |
|---|---|---|
| JP | 2019-212204 A | 12/2019 |
| JP | 2021091492 A | 6/2021 |
| JP | 2021124380 A | 8/2021 |

OTHER PUBLICATIONS

Notice of Reasons for Refusal received in JP2022-164927, dated Feb. 3, 2026, in 5 pages (with translation).

* cited by examiner

*Primary Examiner* — Hunter B Lonsberry
*Assistant Examiner* — Harrison Heflin
(74) *Attorney, Agent, or Firm* — Procopio, Cory, Hargreaves & Savitch LLP

(57)     ABSTRACT

Provided is an altitude calculation method for a flying body including calculating an altitude of the flying body by using information on horizontal coordinates of the flying body, a reception signal strength of a radio signal, and altitude calculation auxiliary information obtained in advance.

14 Claims, 11 Drawing Sheets

| ALTITUDE (m) | RECEPTION SIGNAL STRENGTH (dBm) | | |
|---|---|---|---|
| | BASE STATION A | BASE STATION B | BASE STATION C |
| 5 | -10 | -20 | -26 |
| 6 | -11 | -21 | -27 |
| 7 | -12 | -22 | -28 |
| 8 | -13 | -23 | -29 |
| 9 | -14 | -24 | -30 |
| 10 | -15 | -25 | -31 |

|                | X(m) | Y(m) | Z(m) | Tx(dBm) |
|----------------|------|------|------|---------|
| BASE STATION A | 1200 | 400  | 10   | 30      |
| BASE STATION B | 900  | 1200 | 15   | 30      |
| BASE STATION C | 800  | 800  | 6    | 20      |

FIG. 8

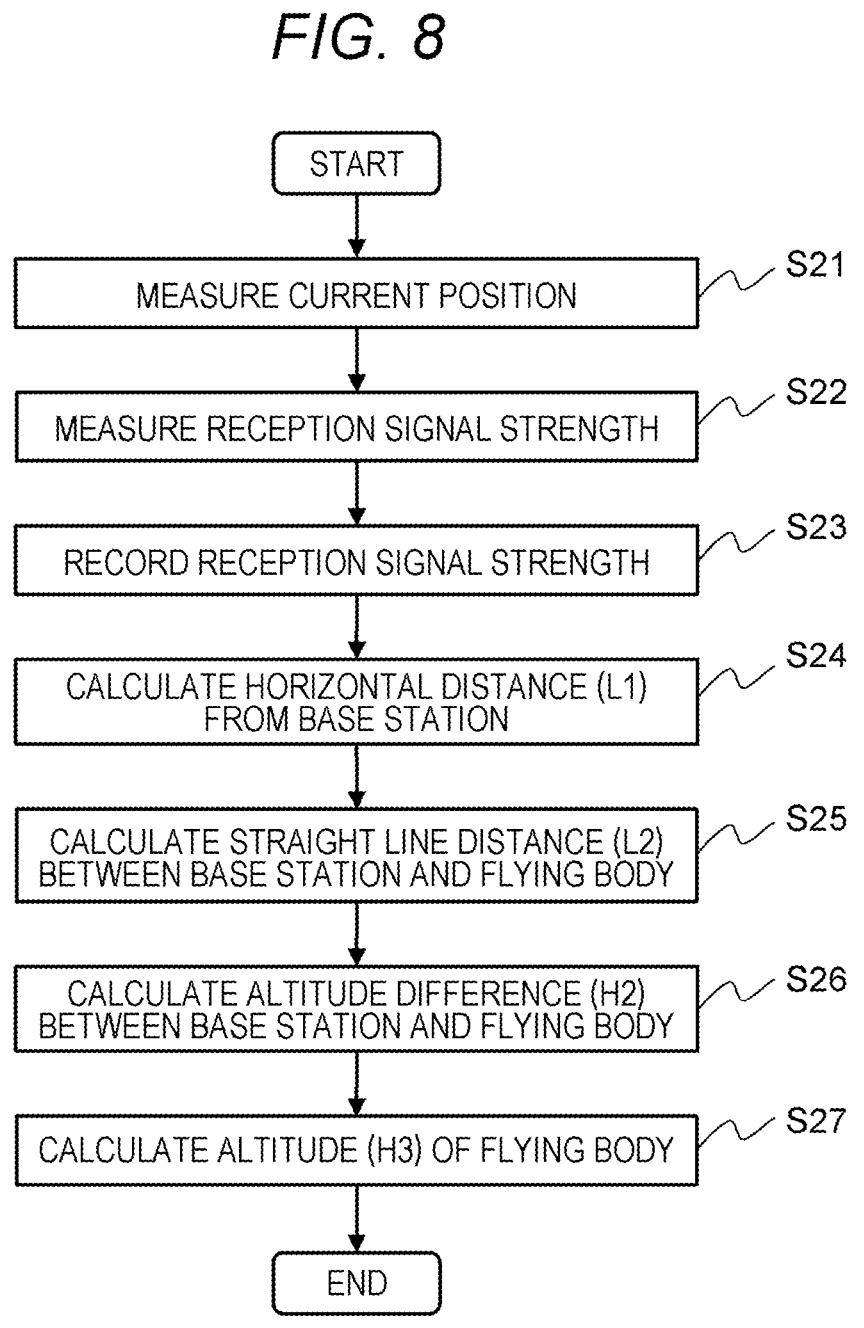

START

MEASURE CURRENT POSITION — S21

MEASURE RECEPTION SIGNAL STRENGTH — S22

RECORD RECEPTION SIGNAL STRENGTH — S23

CALCULATE HORIZONTAL DISTANCE (L1) FROM BASE STATION — S24

CALCULATE STRAIGHT LINE DISTANCE (L2) BETWEEN BASE STATION AND FLYING BODY — S25

CALCULATE ALTITUDE DIFFERENCE (H2) BETWEEN BASE STATION AND FLYING BODY — S26

CALCULATE ALTITUDE (H3) OF FLYING BODY — S27

END

|  | CHANGE ALTITUDE (m) | CHANGE AMOUNT (dB) |
|---|---|---|
| BASE STATION A | 10 | 10 |
| BASE STATION B | 30 | 8 |
| BASE STATION C | 5 | 5 |

| ALTITUDE CHANGE (m) | CHANGE AMOUNT OF RECEPTION SIGNAL STRENGTH (dB) | | |
|---|---|---|---|
| | BASE STATION A | BASE STATION B | BASE STATION C |
| 30m-28m | 10 | 5 | 3 |
| 28m-26m | 8 | 4 | 3 |
| 26m-24m | 7 | 6 | 3 |
| 24m-22m | 10 | 8 | 4 |
| 22m-20m | 6 | 7 | 5 |

START

↓

CONFIRM WHETHER FLYING
BODY REACHES MEASURING POSITION — S41

↓

MEASURE RECEPTION SIGNAL STRENGTH — S42

↓

LOWER AIRCRAFT BY DEFINED ALTITUDE (H5) — S43

↓

MEASURE RECEPTION SIGNAL STRENGTH — S44

↓

RECORD CHANGE AMOUNT — S45

↓

REFER TO CHANGE AMOUNT
CORRESPONDENCE TABLE — S46

↓

CALCULATE ALTITUDE OF FLYING BODY — S47

↓

END

ALTITUDE CALCULATION METHOD AND ALTITUDE CALCULATION PROGRAM FOR FLYING BODY, AND FLYING BODY INCLUDING THE SAME

BACKGROUND OF THE INVENTION

1. Field of the Invention

The present invention relates to an altitude calculation technology for a flying body.

2. Description of the Related Art

In response to recent social problems such as a decrease in the labor population and decarbonization, diversified multistage is also required in the field of mobility. In particular, with development of drone technology, demand for air mobility for logistics and short/middle distance movement is increasing, and automation (unmanned) of flying bodies and 3D of economic activities by speeding up are expected to be technologies essential for future continuous development.

Accurate specification of a current position is essential for automation of a flying body, and various methods such as a pattern matching technology for searching for a corresponding position from a video from a camera carried on a flying body in addition to satellite positioning such as a global navigation satellite system (GNSS) have been studied. Regarding a flying body altitude, there are many flying bodies capable of measuring the altitude by a barometer in addition to the GNSS positioning. However, since the GNSS uses a satellite for position calculation, coordinates can be calculated with high accuracy in a horizontal direction, but there is a problem that an error easily occurs in coordinates in a vertical direction. In addition, since a change amount of atmospheric pressure depending on the altitude is not large, it is difficult to measure a precise altitude with a barometer.

On the other hand, JP 2019-212204 A discloses a background art in the present technical field. JP 2019-212204 A discloses that a surrounding image is photographed from a camera carried on a flying body, and a flying position of the flying body is estimated with higher accuracy with reference to a structure serving as a mark.

SUMMARY OF THE INVENTION

As described in JP 2019-212204 A, it is conceivable to estimate an accurate altitude using a structure serving as a mark as a reference, based on a captured image from a camera. However, when the flying body is operated in an urban area such as air mobility, it is assumed that a take-off and landing port is installed on a rooftop of a building or the like. In this case, when there is no building higher than the building serving as the take-off and landing port in the surroundings, there is no structure or the like serving as an altitude mark, so that the altitude cannot be estimated by pattern matching and an accurate altitude cannot be obtained.

On the other hand, as an altitude measurement, there is a method for measuring a distance to a ground by using a laser distance meter. Here, since there is a possibility that a large number of flying bodies are operated at the same time in the air mobility, it is assumed that the plurality of flying bodies are on standby above the take-off and landing port at the time of take-off and landing. In this case, when there is another flying body below the flying body, the flying body is blocked by the another flying body, and the altitude cannot be measured by the laser distance meter. In addition, when a device for the altitude measurement such as the laser distance meter is added, a burden also occurs in terms of an aircraft weight and cost.

In view of the above problems, an object of the present invention is to provide an altitude calculation method and an altitude calculation program for a flying body, and a flying body including the same capable of calculating an accurate altitude without an additional measurement apparatus even in a place where there is no structure serving as a mark in the surroundings or in a place where there is another flying body below the flying body.

The present invention is, for example, an altitude calculation method for a flying body, in which the altitude of the flying body is calculated by using information on horizontal coordinates of the flying body, a reception signal strength of a radio signal, and altitude calculation auxiliary information obtained in advance.

According to the present invention, it is possible to provide an altitude calculation method and an altitude calculation program for a flying body, and a flying body including the same, in which an accurate altitude can be calculated without an additional measurement apparatus even in a place where there is no structure serving as a mark in the surroundings or in a place where there is another flying body below the flying body.

BRIEF DESCRIPTION OF THE DRAWINGS

FIG. 4 is a diagram illustrating correspondence information between an altitude and a reception signal strength in the first embodiment;

FIG. 8 is a processing flowchart of an altitude calculation unit in the second embodiment;

DESCRIPTION OF THE PREFERRED EMBODIMENTS

Hereinafter, embodiments of the present invention will be described with reference to the drawings.

First Embodiment

Figure 1:
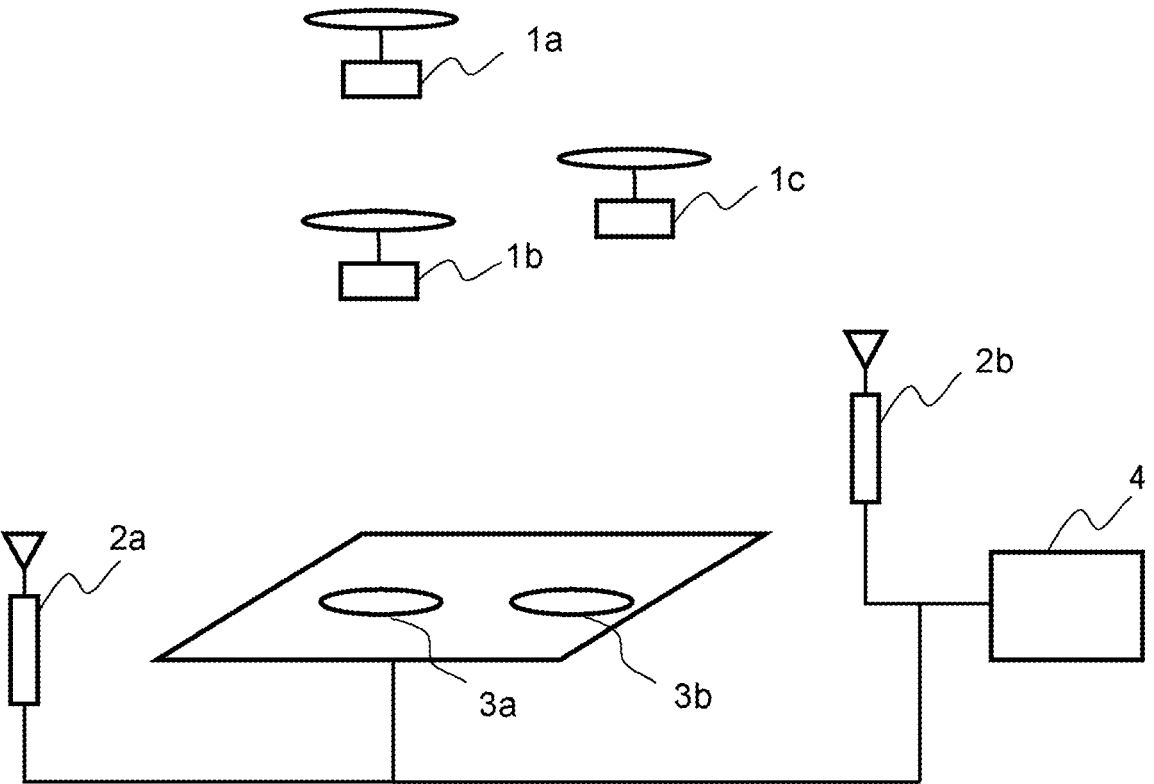
FIG. 1 is a configuration diagram of an altitude calculation system in a first embodiment.

FIG. 1 is a configuration diagram of an altitude calculation system in the present embodiment. In FIG. 1, the altitude calculation system includes flying bodies 1*a*, 1*b*, and 1*c* capable of radio communication (hereinafter, collectively referred to as a flying body 1), radio base stations 2*a* and 2*b* that perform radio communication with the flying body 1 (hereinafter, collectively referred to as a radio base station 2 or a base station 2), take-off and landing ports 3*a* and 3*b* at which the flying body 1 takes off and lands (hereinafter, collectively referred to as a take-off and landing port 3), and a control system 4 that controls the flying body 1.

The flying body 1 carries a load, a person, and the like from the take-off and landing port 3 installed in various places, flies to a destination, and lands at the take-off and landing port 3 of the destination to carry the person and the load. The control system 4 obtains information such as a position, a state, and a destination of the flying body 1 in an airspace to be controlled, formulates an instruction for safe operation of all the flying bodies 1 in the airspace based on the information, and instructs each flying body 1 by using radio communication. Each flying body 1 operates in accordance with instructions such as movement, standby, and take-off and landing from the control system 4.

Figure 2:
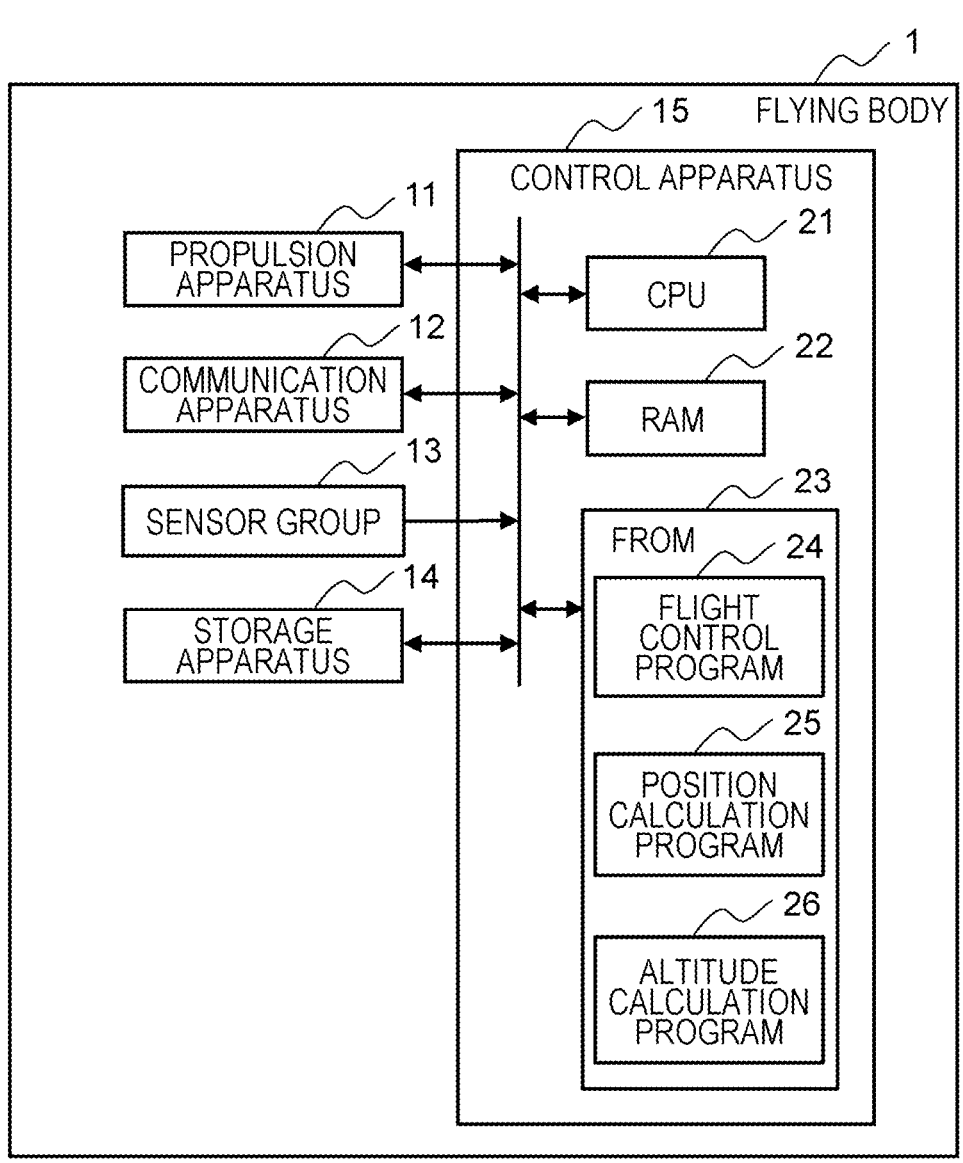
FIG. 2 is a hardware configuration diagram of a flying body in the first embodiment.

FIG. 2 is a hardware configuration diagram of the flying body in the present embodiment. In FIG. 2, the flying body 1 includes a motor that is an engine for moving the flying body, a propulsion apparatus 11 such as a rotor, a communication apparatus 12 that communicates with an outside such as a control system, a sensor group 13 that measures an attitude and the like of the flying body, a storage apparatus 14 that records necessary information, and a control apparatus (computer) 15 that controls each apparatus. The control apparatus 15 includes a CPU 21, a RAM 22, and a flash read only memory (FROM) 23. In the control apparatus 15, a CPU or the like interprets an operation program and executes various functions by software processing.

The FROM 23 includes, as processing programs, a flight control program 24 that performs overall control of the flying body, a position calculation program 25, and an altitude calculation program 26 that calculates a current altitude of the own device. These processing programs are developed in the RAM 22 and executed by the CPU 21. The FROM 23 may be one memory medium as illustrated in the drawing or may include a plurality of memory media. Furthermore, a non-volatile memory medium other than the flash ROM may be used.

The flight control program 24 controls the propulsion apparatus 11 based on measurement data from the sensor group 13 such as a gyro sensor and an acceleration sensor to control the attitude of the flying body. The position calculation program 25 performs processing of calculating the current position of the own device by using GNSS or the like. In addition, the flight control program 24 notifies the control system 4 of own device position information obtained by adding the calculation result by the processing of the position calculation program 25 and the altitude information calculated by the processing of the altitude calculation program 26 and information such as a destination recorded in the storage apparatus 14 by using the communication apparatus 12, and performs processing of receiving an instruction from the control system 4. In addition, the flight control program 24 performs processing such as take-off and landing, standby in the sky, and movement by using the propulsion apparatus 11 in accordance with the instruction from the control system 4. Note that the contents of the present embodiment can be executed even in a case where a pilot on board an aircraft or a remote pilot who operates the aircraft from a remote location through radio communication operates the flying body.

Figure 3:
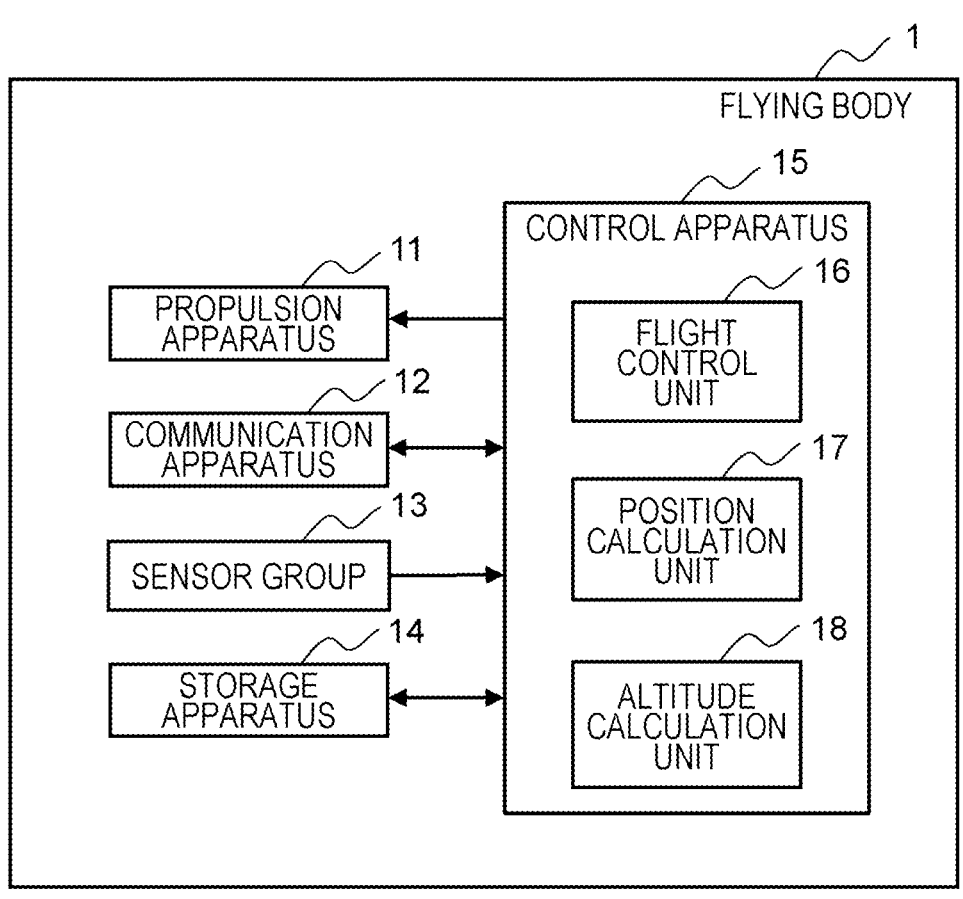
FIG. 3 is a functional configuration diagram of the flying body in the first embodiment.

FIG. 3 is a functional configuration diagram of the flying body in the present embodiment. In FIG. 3, the same components as those in FIG. 2 are denoted by the same reference numerals, and the description thereof will be omitted. In FIG. 3, a difference from the hardware configuration diagram of FIG. 2 is that the control apparatus 15 is configured as a flight control unit 16 that performs processing by the flight control program 24 in FIG. 2, a position calculation unit 17 that performs processing by the position calculation program 25, and an altitude calculation unit 18 that performs processing by the altitude calculation program 26.

Next, an altitude calculation method in the present embodiment will be described. In the present embodiment, a reception signal strength of a radio signal for communication is measured and compared with a reception signal strength distribution map of the corresponding airspace measured in advance to estimate an accurate altitude. Note that, in the present embodiment, the altitude of the flying body is calculated at a specific reception signal measurement place. For example, a place where the position is clearly known, such as above a take-off and landing port, and a wireless environment at the position is stable is set as an altitude calculation place.

In the altitude calculation place, a reception signal strength of a signal from a radio base station at each altitude is measured in advance, and correspondence information (correspondence table) between the altitude and the reception signal strength is created as altitude calculation auxiliary information. In a case where there is a plurality of receivable base stations, the plurality of receivable base stations are combined to create the correspondence information. FIG. 4 illustrates an example of the correspondence information between the altitude and the reception signal strength. In FIG. 4, base stations A, B, and C are described as correspondence information 5 between the altitude and the reception signal strength.

Figure 5:
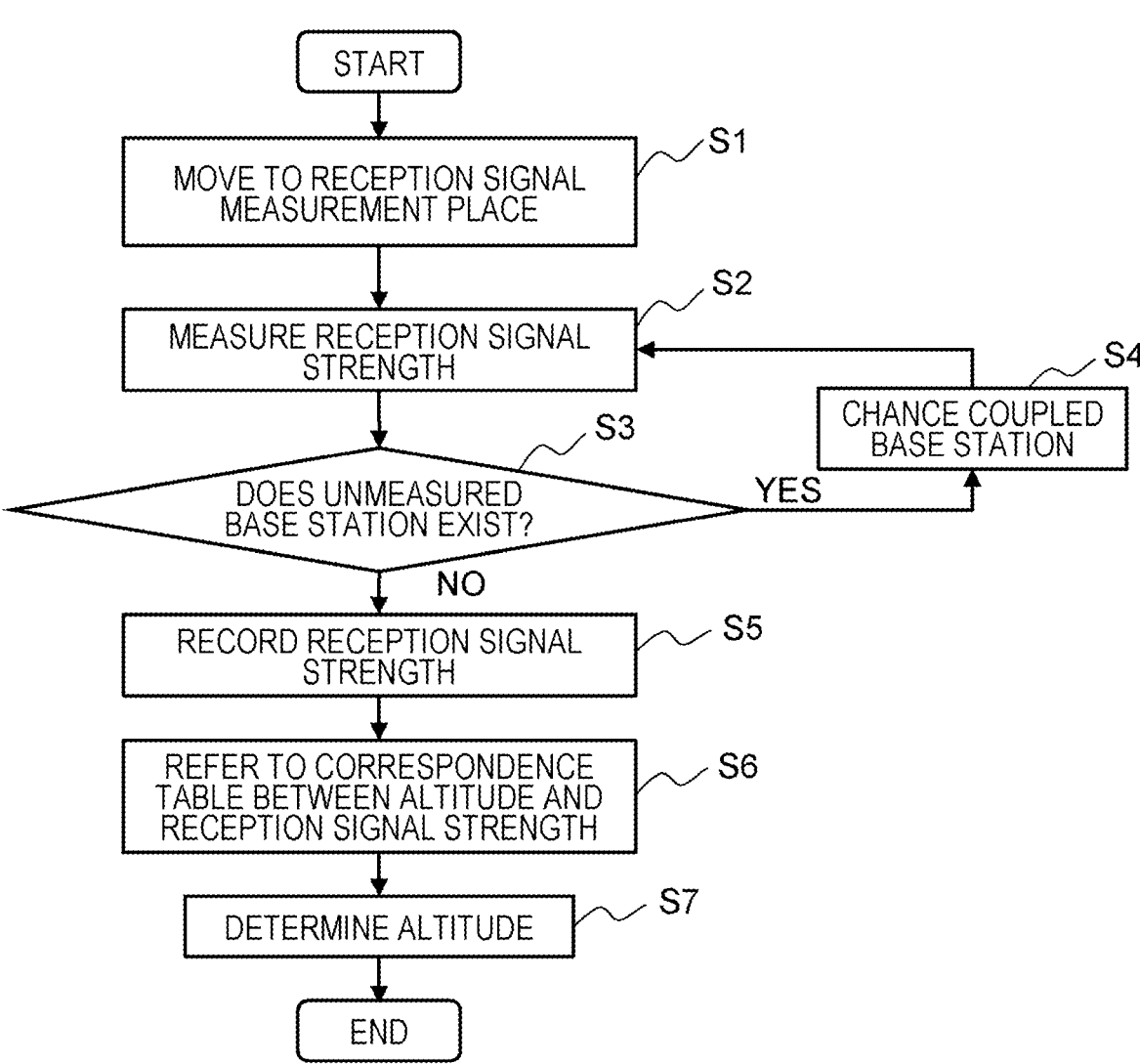
FIG. 5 is a processing flowchart of an altitude calculation unit in the first embodiment.

FIG. 5 is a processing flowchart of the altitude calculation unit indicating an altitude calculation procedure of the flying body in the present embodiment. In FIG. 5, when the flying body calculates the altitude of the own device, the flying body first moves to a reception signal measurement place predetermined by the own device by using the position calculation unit 17 (step S1). Next, at the position, a reception signal strength of a radio signal from the base station 2 is measured by using the communication apparatus 12 (step S2). For example, in a case where long term evolution (LTE) is used as the radio communication, a reception signal strength indicator (RSSI) acquired by a reception apparatus at the time of communication is set as the reception signal strength. At this time, in order to increase the measurement accuracy, measurement may be performed a plurality of times on the same base station, and the result may be statistically processed to obtain the reception signal strength. After the measurement, it is confirmed whether there is still a receivable unmeasured base station at the measurement point (step S3), and when there is the unmeasured base station, switching to the base station is performed (step S4) to measure the reception signal strength. When the unmeasured base station does not exist, necessary statistical processing is performed on each measurement result, and the measurement result is recorded in the storage apparatus 14 for each base station (step S5).

Next, in step S6, with respect to the measurement result of the reception signal strength, an altitude matching the measurement result is obtained with reference to the correspondence information between the altitude and the reception signal strength in the storage apparatus 14 (step S7). As a method for determining whether the altitude matches, there are a method for selecting an altitude at which a sum of absolute errors from the reception signal strengths of the base stations is the smallest, a method for weighting a base station having a strong reception signal strength and evaluating a magnitude of the error, and the like.

As described above, according to the present embodiment, an accurate altitude can be calculated even in a place where there is no structure serving as a mark in the surroundings or in a place where there is another flying body below the flying body. In addition, since a wireless device used for communication is used, an accurate altitude can be calculated without an additional measurement apparatus.

Second Embodiment

Figures 6, 7:
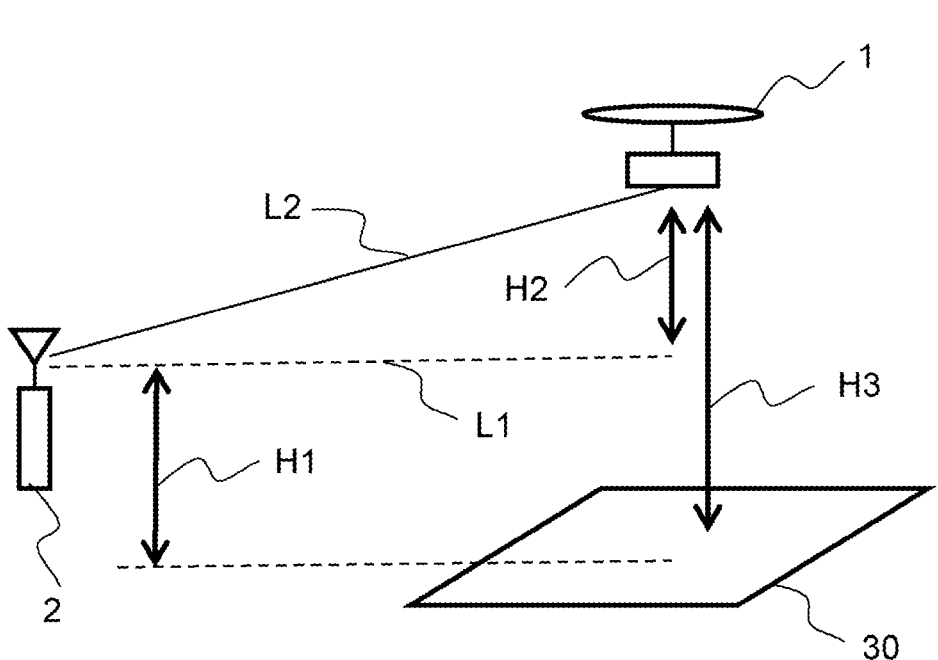
FIG. 6 is a diagram for describing an altitude calculation method for a flying body in a second embodiment.
FIG. 7 is a diagram illustrating base station information in the second embodiment.

In the first embodiment, the altitude of the flying body is calculated at a specific calculation place. On the other hand, in the present embodiment, a method for calculating the altitude of the flying body at an arbitrary place will be described. FIG. 6 is a diagram for describing an altitude calculation method for the flying body in the present embodiment.

As a premise of the present embodiment, the flying body has, as the altitude calculation auxiliary information, base station information including information on coordinates of the radio base station in a horizontal direction, an antenna installation height (H1), and a transmission power strength in the storage apparatus in advance. An example of the base station information is illustrated in FIG. 7. In FIG. 7, as the base station information 6, the base stations A, B, and C have position coordinates X, Y, and Z and a transmission power strength Tx.

In FIG. 6, a horizontal distance (L1) between the flying body 1 and the radio base station 2 is calculated by using the base station information 6 and the position information of the own device measured by the flying body. For example, in a case where the coordinates of the base station 2 are (x1, y1) and the coordinates of the flying body 1 are (x2, y2), the horizontal distance (L1) is obtained by the following equation (1).

$$L1^2 = (x1 - x2)^2 + (y1 - y2)^2 \qquad (1)$$

Next, the flying body 1 measures the reception signal strength from the base station 2 at the position. A propagation distance of a signal is calculated from the reception power strength measurement result and the information on the transmission power strength of the base station 2, and is set as a straight line distance (L2) between the base station 2 and the flying body 1. A magnitude of an attenuation amount depending on the distance of the radio signal is obtained from a transmission formula of Fries. In addition, in a case where a shielding object exists between the base station and the flying body in an urban area or the like, the propagation distance can be estimated by using a propagation model such as a Walfisch-pond model. From L2 and L1 obtained as described above, a relative altitude (H2) between the flying body 1 and the base station 2 is calculated by the following equation (2).

$$H2^2 = L2^2 - L1^2 \qquad (2)$$

From the relative altitude (H2) and the antenna installation height (H1) from a zero altitude position 30 of the base station 2, an altitude (H3) from the zero altitude position 30 of the flying body is obtained by the following equation (3).

$$H3 = H1 + H2 \qquad (3)$$

FIG. 8 is a processing flowchart of the altitude calculation unit illustrating the altitude calculation procedure of the flying body in the present embodiment. In FIG. 8, the flying body first calculates the position of the own device in the position calculation unit 17 (step S21). Next, the flying body measures the reception signal strength of the signal from the radio base station at the position by using the communication apparatus 12 (step S22), performs necessary statistical processing, and records the reception signal strength (step S23). Next, the altitude calculation unit refers to the position information of the base station received from the base station information in the storage apparatus, and calculates the horizontal distance (L1) between the base station and the flying body from the information by using the equation (1) (step S24).

Next, the altitude calculation unit calculates a straight line distance between the base station and the flying body from the measured reception signal strength and a transmission signal strength obtained from the base station information (step S25). Next, the altitude calculation unit calculates the relative altitude (H2) between the base station and the flying body by using the equation (2) from the horizontal distance (L1) and the straight line distance (L2) between the base station and the flying body obtained so far (step S26). Then, the altitude calculation unit calculates the altitude (H3) of the flying body by using the equation (3) from the relative altitude (H2) and the antenna installation height (H1) of the base station described in the base station information (step S27). Note that the above measurement may be performed on a plurality of receivable base stations, and the altitude of the flying body may be calculated by statistical processing of the measurement results.

As described above, according to the present embodiment, in addition to the effect of the first embodiment, the altitude of the flying body can be calculated at an arbitrary place.

Third Embodiment

Figures 9, 10:
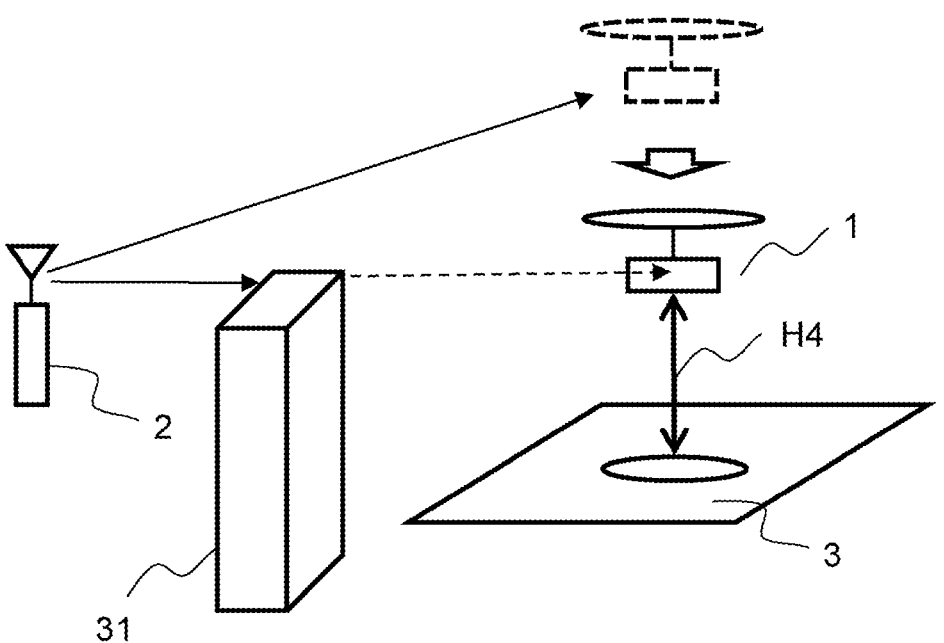
FIG. 9 is a diagram for describing an altitude calculation method for a flying body in a third embodiment.
FIG. 10 is a diagram illustrating reception strength change information in the third embodiment.

In the present embodiment, a method for calculating an altitude of a flying body in an environment where a change in a reception signal strength is large will be described. FIG. 9 is a diagram for describing an altitude calculation method for the flying body in the present embodiment.

As a premise of the present embodiment, the flying body has, as the altitude calculation auxiliary information at the calculation point, reception strength change information in which a change altitude (H4) at which the reception signal strength from the radio base station changes and a change amount thereof are described in the storage apparatus. FIG. 10 illustrates an example of the reception strength change information. In FIG. 10, as reception strength change information 7, the base stations A, B, and C have a change altitude at which the reception signal strength changes and a change amount thereof.

In FIG. 9, when the flying body 1 reaches above a measurement place, the flying body 1 changes the altitude while receiving a signal from the radio base station 2. At this time, in a case where the reception signal strength at the flying body 1 greatly changes due to a factor such as existence of a shielding object 31 between the base station 2 and the flying body 1 to block the visibility, the change amount is recorded. Based on this change amount, the reception strength change information 7 at the measurement point is referred to, the altitude at which the change occurs is obtained, and this is taken as the altitude of the aircraft.

Figure 11:
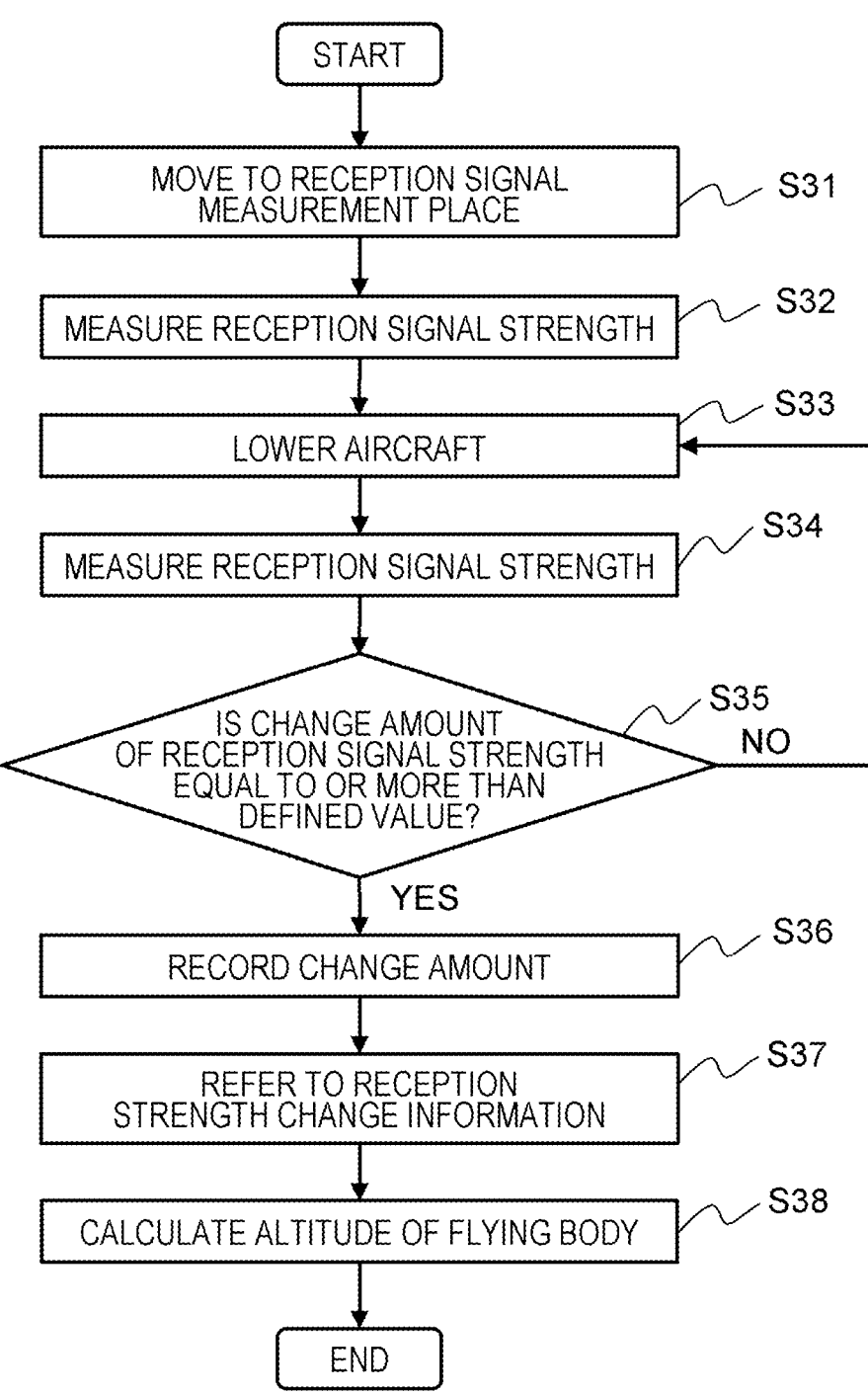
FIG. 11 is a processing flowchart of an altitude calculation unit in the third embodiment.

FIG. 11 is a processing flowchart of the altitude calculation unit illustrating the altitude calculation procedure of the flying body in the present embodiment. In FIG. 11, the flying body first moves to the reception signal measurement place (step S31). Next, the flying body measures the reception signal strength of the signal from the base station at the position by using the communication apparatus 12 (step S32). From there, the aircraft is lowered (step S33), and the reception signal strength is measured again at the position after the lowering (step S34). The altitude calculation unit compares the reception signal strengths before and after the movement, and confirms whether it exceeds a predefined conversion amount (step S35). When it does not exceed the predefined conversion amount, the point is further lowered by using the point as a reference point, and the same measurement and comparison are repeated. When the change amount exceeds the defined value, the altitude calculation unit records the change amount (step S36), and confirms at which altitude the change occurs with reference to the reception strength change information 7 (step S37). As a result, the altitude calculation unit calculates the altitude of the flying body at that time point (step S38). Note that in the present embodiment, it is assumed that the altitude of the flying body is calculated in an environment where the change in the reception signal strength is large. Therefore, in step S35, it is assumed that it exceeds the predefined conversion amount of the reception signal strength at any altitude during the lowering of the flying body. However, on the assumption that the change amount of the reception signal strength does not exceed the predetermined value, in step S35, processing for disabling the altitude calculation may be performed when the altitude of the flying body becomes equal to or lower than a predetermined value.

As described above, according to the present embodiment, in addition to the effects of the first and second embodiments, the accurate altitude of the flying body can be calculated even in an environment where the change in the reception signal strength is large.

Fourth Embodiment

Figures 12, 13:
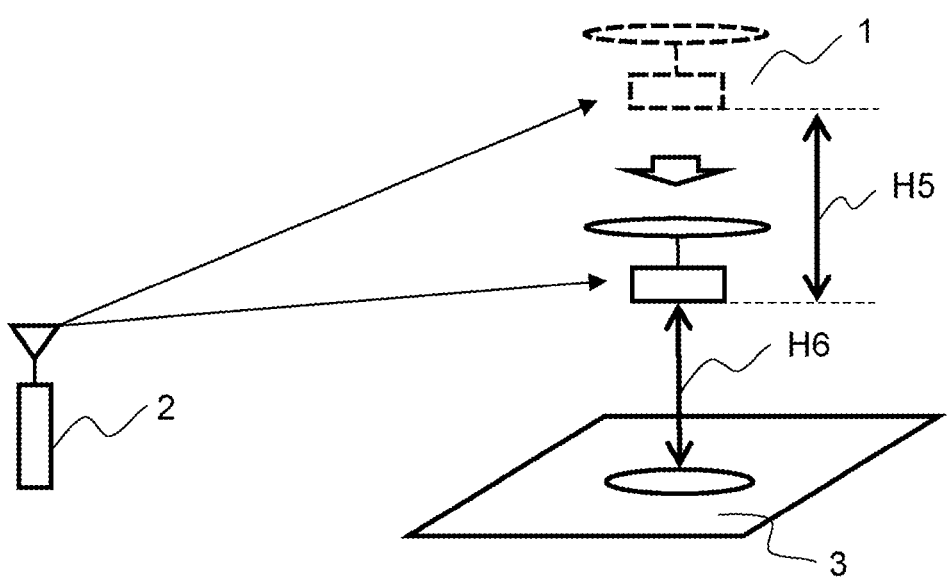
FIG. 12 is a diagram for describing an altitude calculation method for a flying body in a fourth embodiment.
FIG. 13 is a diagram illustrating change amount correspondence information in the fourth embodiment.

In the present embodiment, another altitude calculation method for the flying body will be described. FIG. 12 is a diagram for describing an altitude calculation method for the flying body in the present embodiment.

As a premise of the present embodiment, the flying body calculates the altitude at a specific reception signal measurement place. In addition, at the measurement place, the flying body has, as the altitude calculation auxiliary information, correspondence information between the change amount of the reception signal strength from the radio base station and the change amount of the altitude in the storage apparatus. FIG. 13 illustrates an example of change amount correspondence information. In FIG. 13, as change amount correspondence information 8, a relationship between the change amount of the altitude and the change amount of the reception signal strength for the base stations A, B, and C is illustrated.

The flying body in the present embodiment can measure a relative change amount of the altitude by an acceleration sensor or the like. In FIG. 12, when the flying body reaches above the measurement point, the flying body changes the altitude while receiving a signal from the radio base station. At this time, the flying body also measures the change amount of the altitude. Therefore, the change amount of the reception signal strength when the altitude change predefined is performed is recorded. An altitude (H6) of the flying body is calculated with reference to the change amount correspondence information 8 for a change amount (H5) of the altitude and the change amount of the reception signal strength.

Figure 14:
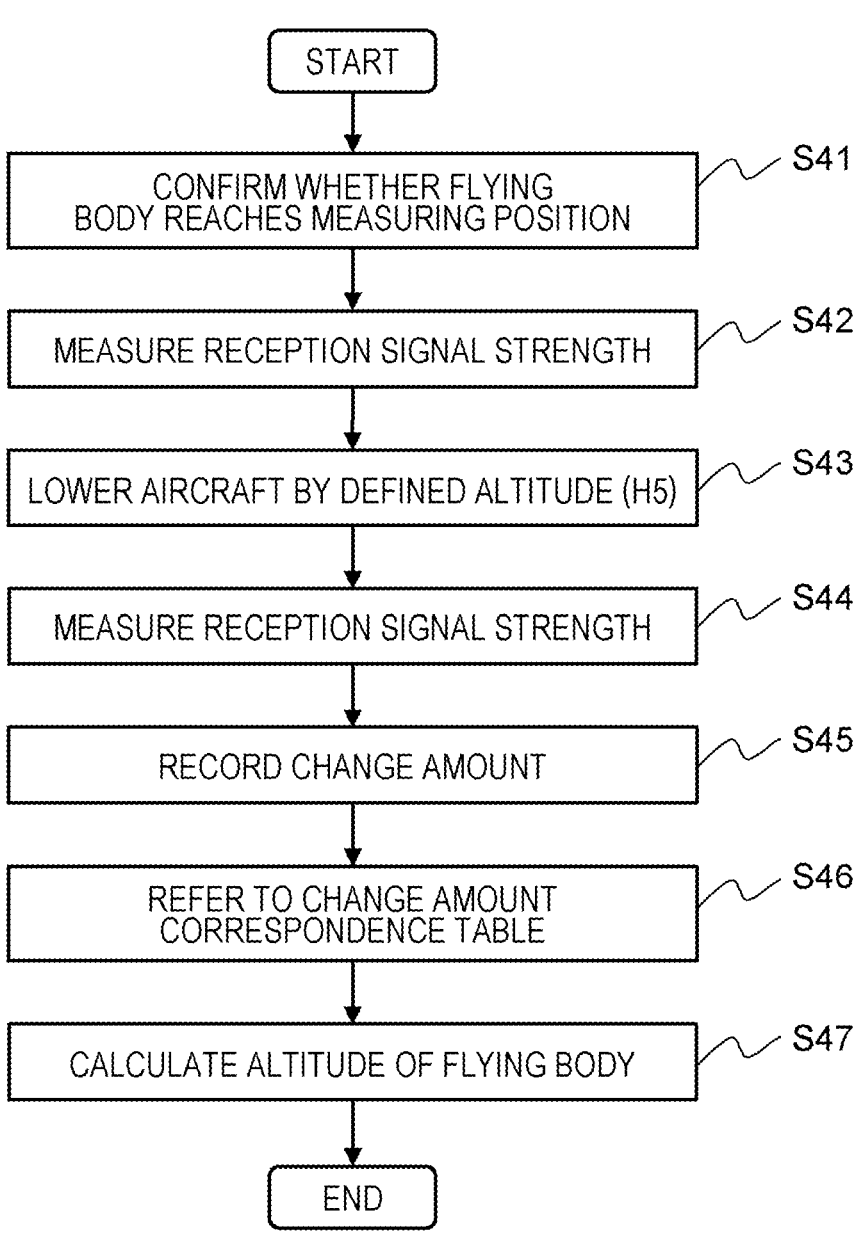
FIG. 14 is a processing flowchart of an altitude calculation unit in the fourth embodiment.

FIG. 14 is a processing flowchart of the altitude calculation unit illustrating the altitude calculation procedure of the flying body in the present embodiment. In FIG. 14, the flying body first moves to a position where a reception signal can be measured (step S41). Next, the flying body measures the reception signal strength of the signal from the base station at the position by using the communication apparatus 12 (step S42). Then, the aircraft is lowered by the change amount (H5) of the altitude predefined (step S43), and the reception signal strength is measured again at the position after the lowering (step S44). The measurement result is recorded in the storage apparatus 14 (step S45). Then, the altitude calculation unit refers to the change amount correspondence information 8 in the storage apparatus 14 for the change amounts of the reception signal strength before and after the movement (step S46). When there is an altitude change corresponding to the change amount, the altitude is set as the aircraft altitude (H6) (step S47). At this time, the reception signal strength may be measured for a plurality of receivable base stations, and the altitude may be calculated based on the result. In addition, in a case where a suitable change amount cannot be found in the change amount correspondence information 8 in one measurement, it is also possible to perform remeasurement by changing the altitude.

As described above, according to the present embodiment, since the altitude is calculated by using the change amount of the altitude in addition to the change amount of the reception signal strength, the altitude can be calculated with higher accuracy as compared with the first embodiment. In addition, since the altitude can be calculated while lowering, there is also an effect that the altitude can be calculated in a sequence during landing.

Although the embodiments according to the present invention have been described above, since the present invention uses an existing wireless device used for communication for altitude calculation, an accurate altitude can be calculated without an additional measurement apparatus. Therefore, resources can be used by using existing wireless devices, and the present invention contributes to waste reduction particularly in responsible consumption and production by the item 12 for realizing sustainable development goals (SDGs).

In addition, the present invention is not limited to the above-described embodiments, and includes various modifications. For example, the above-described embodiments have been described in detail for easy understanding of the present invention, and are not necessarily limited to those having all the described configurations. In addition, a part of the configuration of a certain embodiment can be replaced with a configuration of another embodiment, and the configuration of another embodiment can be added to the configuration of a certain embodiment. In addition, it is also possible to add, delete, and replace other configurations for a part of the configuration of each embodiment.

What is claimed is:

1. An altitude calculation method for a flying body having a motor for moving the flying body, a propulsion apparatus, a communication apparatus that communicates with an outside, a sensor group that measures an attitude of the flying body, a storage apparatus, and a control apparatus, the method comprising:

measuring a reception signal strength of a radio signal for communication;

calculating an altitude of the flying body by using information on horizontal coordinates of the flying body, the reception signal strength of the radio signal, and altitude calculation auxiliary information obtained in advance, wherein the reception signal strength is compared with a reception signal strength distribution map of a corresponding airspace measured in advance to estimate the altitude, and wherein the altitude calculation auxiliary information is correspondence information between an altitude at a specific horizontal coordinate position and the reception signal strength;

moving the flying body to the specific horizontal coordinate position by using the information on the horizontal coordinates of the flying body;

measuring the reception signal strength of the radio signal at the specific horizontal coordinate position; and calculating the altitude of the flying body from the reception signal strength at the specific horizontal coordinate position and the correspondence information between the altitude and the reception signal strength.

2. The altitude calculation method according to claim 1, wherein the altitude calculation auxiliary information is information related to horizontal coordinates altitude position information, and a transmission power of a radio base station receivable by the flying body, and the method further comprising:

performing radio communication with the radio base station and calculating a straight line distance between the radio base station and the flying body from the reception signal strength of the radio communication and the transmission power of the radio base station that has performed the radio communication;

calculating a horizontal distance between the flying body and the radio base station from position information of the horizontal coordinates of the flying body obtained from a position calculation apparatus of the flying body and the horizontal coordinates of the radio base station;

calculating an altitude difference between the radio base station and the flying body from the straight line distance and the horizontal distance; and calculating the altitude of the flying body from the altitude difference and the altitude position information of the radio base station.

3. The altitude calculation method according to claim 1, wherein the altitude calculation auxiliary information is correspondence information between a change altitude at which the reception signal strength changes at the specific horizontal coordinate position and a change amount thereof, and the method further comprising:

measuring the reception signal strength of the radio signal with respect to the change in the altitude of the flying body at the specific horizontal coordinate position; and calculating the altitude of the flying body from the change altitude of the correspondence information with respect to the change amount when a change amount of the measured reception signal strength exceeds a change amount of the correspondence information.

4. The altitude calculation method according to claim 1, wherein the altitude calculation auxiliary information is correspondence information indicating a relationship between a change amount of an altitude at the specific horizontal coordinate position and a change amount of the reception signal strength, and the method further comprising:

measuring the reception signal strength of the radio signal with respect to the change in the altitude of the flying body at the specific horizontal coordinate position;

referring to the correspondence information based on the change amount of the reception signal strength of the radio signal with respect to the measured altitude change; and calculating the altitude of the flying body from the altitude change in which the reception signal strength changes.

5. The altitude calculation method according to claim 1, wherein the altitude calculation auxiliary information is correspondence information between an altitude and the reception signal strength at a specific reception signal measurement place, and wherein the reception signal strength is measured a plurality of times on a same base station and statistically processed to obtain the reception signal strength.

6. The altitude calculation method according to claim 1, wherein the altitude calculation auxiliary information includes correspondence information indicating a relationship between a change amount of an altitude at a specific horizontal coordinate position and a change amount of the reception signal strength, and wherein the altitude of the flying body is calculated while lowering the flying body during a landing sequence.

7. A flying body comprising:

a propulsion apparatus for moving;

a communication apparatus for communicating with an outside;

a storage apparatus; and a control apparatus, wherein the storage apparatus stores altitude calculation auxiliary information obtained in advance, the control apparatus controls the propulsion apparatus to move the flying body, calculates information on horizontal coordinates of the flying body during movement, measures a reception signal strength of a radio signal by using the communication apparatus, and calculates an altitude of the flying body by using the information on the horizontal coordinates of the flying body, the reception signal strength of the radio signal, and the altitude calculation auxiliary information read from the storage apparatus, and measures the reception signal strength of the radio signal for communication, the reception signal strength is compared with a reception signal strength distribution map of a corresponding airspace measured in advance to estimate the altitude, the altitude calculation auxiliary information is correspondence information between an altitude at a specific horizontal coordinate position and the reception signal strength, and the control apparatus:

controls the propulsion apparatus to move the flying body to the specific horizontal coordinate position by using the information on the horizontal coordinates of the flying body;

measures the reception signal strength of the radio signal by using the communication apparatus at the specific horizontal coordinate position; and calculates the altitude of the flying body from the reception signal strength at the specific horizontal coordinate position and the correspondence information between the altitude and the reception signal strength.

8. The flying body according to claim 7, wherein the altitude calculation auxiliary information is information related to horizontal coordinates, altitude position information, and a transmission power of a radio base station receivable by the flying body, and the control apparatus performs radio communication with the radio base station by using the communication apparatus, and calculates a straight line distance between the radio base station and the flying body from a reception signal strength of the radio communication and the transmission power of the radio base station that has performed the radio communication, calculates a horizontal distance between the flying body and the radio base station from position information of the horizontal coordinates of the flying body obtained from a position calculation apparatus of the flying body and the horizontal coordinates of the radio base station, calculates an altitude difference between the radio base station and the flying body from the straight line distance and the horizontal distance, and calculates the altitude of the flying body from the altitude difference and the altitude position information of the radio base station.

9. The flying body according to claim 7, wherein the altitude calculation auxiliary information is correspondence information between a change altitude at which the reception signal strength changes at the specific horizontal coordinate position and a change amount thereof, and the control apparatus:

measures the reception signal strength of the radio signal with respect to an altitude change of the flying body by using the communication apparatus at the specific horizontal coordinate position, and calculates the altitude of the flying body from the change altitude of the correspondence information with respect to the change amount when a change amount of the measured reception signal strength exceeds a change amount of the correspondence information.

10. The flying body according to claim 7, wherein the altitude calculation auxiliary information is correspondence information indicating a relationship between a change amount of the altitude at the specific horizontal coordinate position and a change amount of a reception signal strength, and the control apparatus:

measures the reception signal strength of the radio signal with respect to an altitude change of the flying body by using the communication apparatus at the specific horizontal coordinate position, refers to the correspondence information based on a change amount of the reception signal strength of the radio signal with respect to the measured altitude change, and calculates the altitude of the flying body from the altitude change in which the reception signal strength changes.

11. A non-transitory computer-readable storage medium storing an altitude calculation program for causing a computer having a CPU, a RAM, and a storage apparatus to execute altitude calculation processing of a flying body, wherein the computer is provided with the storage apparatus that stores altitude calculation auxiliary information, and the altitude calculation program causes the computer to execute processing of measuring a reception signal strength of a radio signal for communication and calculating an altitude of the flying body by using information on horizontal coordinates of the flying body, the reception signal strength of the radio signal, and altitude calculation auxiliary information stored in the storage apparatus, the reception signal strength is compared with a reception signal strength distribution map of a corresponding airspace measured in advance to estimate the altitude, the altitude calculation auxiliary information is correspondence information between an altitude at a specific horizontal coordinate position and the reception signal strength, and the altitude calculation program causes the computer to execute:

a step of moving the flying body to the specific horizontal coordinate position by using information on the horizontal coordinates of the flying body;

a step of measuring the reception signal strength of the radio signal at the specific horizontal coordinate position; and a step of calculating the altitude of the flying body from the reception signal strength at the specific horizontal coordinate position and correspondence information between the altitude and the reception signal strength.

12. The altitude calculation program according to claim 11, wherein the altitude calculation auxiliary information is information related to horizontal coordinates, altitude position information, and a transmission power of a radio base station receivable by the flying body, and the altitude calculation program causes the computer to execute a step of performing radio communication with the radio base station and calculating a straight line distance between the radio base station and the flying body from a reception signal strength of the radio communication and the transmission power of the radio base station that has performed the radio communication, a step of calculating a horizontal distance between the flying body and the radio base station from position information of the horizontal coordinates of the flying body obtained from a position calculation apparatus of the flying body and the horizontal coordinates of the radio base station, a step of calculating an altitude difference between the radio base station and the flying body from the straight line distance and the horizontal distance, and a step of calculating the altitude of the flying body from the altitude difference and the altitude position information of the radio base station.

13. The altitude calculation program according to claim 11, wherein the altitude calculation auxiliary information is correspondence information between a change altitude at which the reception signal strength changes at the specific horizontal coordinate position and a change amount thereof, and the altitude calculation program causes the computer to execute;

a step of measuring the reception signal strength of the radio signal with respect to an altitude change of the flying body at the specific horizontal coordinate position, and when a change amount of the measured reception signal strength exceeds a change amount of the correspondence information, calculating the altitude of the flying body from the change altitude of the correspondence information with respect to the change amount.

14. The altitude calculation program according to claim 11, wherein the altitude calculation auxiliary information is correspondence information indicating a relationship between a change amount of the altitude at a specific horizontal coordinate position and a change amount of the reception signal strength, and the altitude calculation program causes the computer to execute;

a step of measuring the reception signal strength of the radio signal with respect to an altitude change of the flying body at the specific horizontal coordinate position, referring to the correspondence information based on a change amount of the reception signal strength of the radio signal with respect to the measured altitude change, and calculating the altitude of the flying body from the altitude change in which the reception signal strength changes.

\* \* \* \* \*